P. L. KEISER.
VALVE FOR HOT BLAST FURNACES.
APPLICATION FILED DEC. 18, 1912.
1,070,693.
Patented Aug. 19, 1913.
2 SHEETS—SHEET 1.
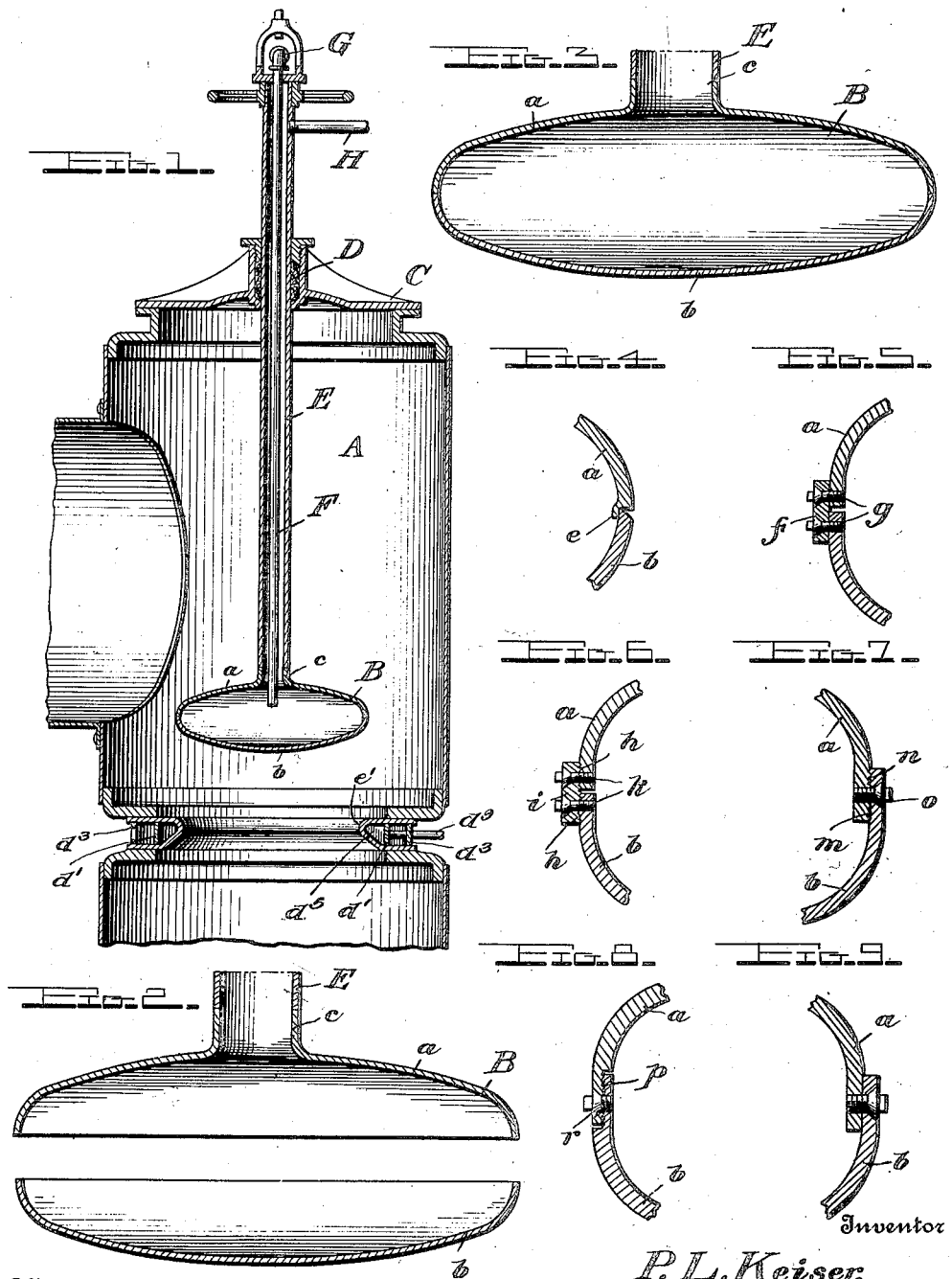
Witnesses
Chas. L. Grieshauer.
G. C. Hennesy.
Inventor
P. L. Keiser,
By W. W. Edmond
Attorney

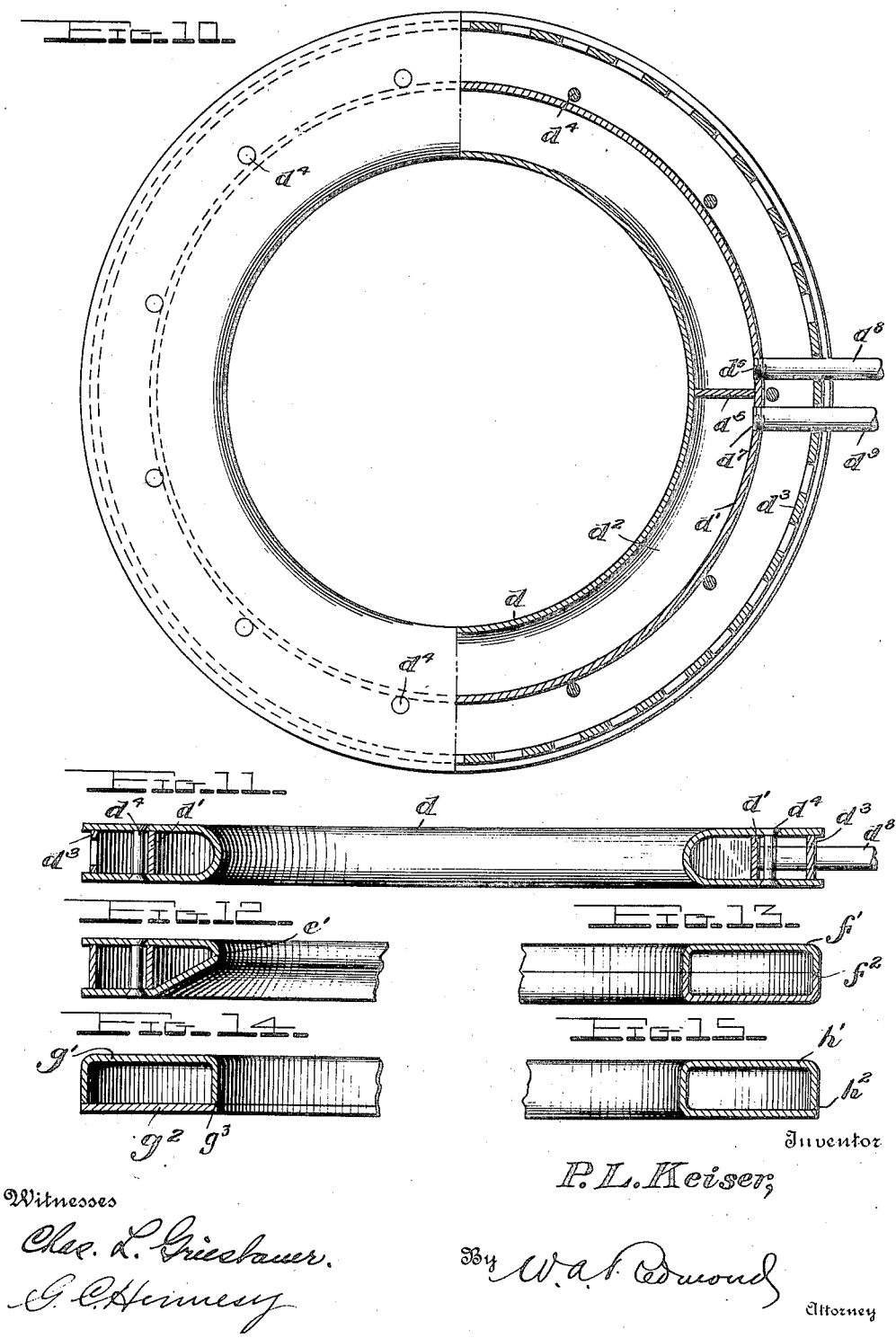

UNITED STATES PATENT OFFICE.

PAUL L. KEISER, OF POTTSTOWN, PENNSYLVANIA.

VALVE FOR HOT-BLAST FURNACES.

1,070,693. Specification of Letters Patent. Patented Aug. 19, 1913.

Application filed December 18, 1912. Serial No. 737,448.

*To all whom it may concern:*

Be it known that I, PAUL L. KEISER, a citizen of the United States, residing at Pottstown, in the county of Montgomery and State of Pennsylvania, have invented a certain new and useful Valve for Hot-Blast Furnaces, of which the following is a specification.

This invention relates generally to valves, and particularly to hot-blast valves, cold-blast valves, and chimney valves for hot-ovens at blast furnaces, and it has for its object to provide a simple, comparatively inexpensive and durable valve of the mushroom type, and a seat therefor, and it consists of the parts and combinations of parts hereinafter described and claimed.

In the accompanying drawings forming a part of this specification, Figure 1 is a vertical section through a valve chamber or casing showing my improved valve in position for operation. Fig. 2 is a vertical section through my improved valve showing the parts or sections comprising the same separated and in position to be joined and welded together. Fig. 3 is a similar view showing the sections welded together. Fig. 4 is a detail sectional view showing a modification of the form of the meeting edges of welding. Figs. 5, 6, 7, 8 and 9, are detail views showing modified means for securing the halves or sections of the valve together. Fig. 10 is a plan view of the valve seat showing one half thereof in horizontal section. Fig. 11 is a transverse vertical section through the valve seat. Figs. 12, 13, 14 and 15 are detail sectional views showing modified forms of the valve seat.

Similar letters refer to similar parts throughout all the views.

Valves of the type under consideration, commonly known as mushroom valves, now in use are made in cast iron and in cast steel and bronze which are, so far as I am informed, the only metals now employed for the purpose. This is also true of the valve seats. With these metals it has been found impossible to hold the cores in place sufficiently close in casting to obtain a perfectly uniform thickness of the metal throughout the casting and, in consequence, it is found practically impossible to simultaneously cool valves or their seats evenly when in use, since a longer period of time is required to cool the thicker portions of the valve and its seat than the thinner. This results in uneven expansion and contraction in the metal which causes it to crack and thus render the parts useless. I obviate the objectionable feature noted to valves and valve seats of this class and provide a valve and seat adapted to withstand the strains to which they are subjected to by reason of the great variance in the temperature of the air passing over the same, which variance ranges within a very few minutes from a temperature of 200 F. to 1600 F., by stamping or pressing the parts from sheet steel. Preferably the valve is formed in two parts, and welded or otherwise rigidly secured together to form the valve, thereby providing a valve of uniform thickness, great strength, durability, and of less weight than valves made in cast metal, and which may be uniformly or evenly cooled in all its parts and thereby avoiding the liability to uneven expansion and contraction of the metal due to uneven cooling which causes the metal to crack. So also the valve seats are pressed, stamped or flanged to shape from steel plates.

Referring to the drawings A represents the usual valve chamber of a hot-blast valve, C the cap of the valve chamber, and D the stuffing box in said cap through which the hollow valve-stem E passes. The valve-stem is connected with any suitable means (not shown) by which it may be moved vertically, so as to seat and unseat the valve.

F is the usual pipe which extends through the valve-stem down into the hollow valve, and through which the water flows to the hollow valve from a water supply pipe G, and, after circulating through the valve, passes up through the valve-stem and escapes through an outlet pipe H at the upper end of the same.

The parts just described may be of the usual or any desired type and form no part of my present invention which relates solely to the valve and its seat.

Referring particularly to Figs. 2 and 3 of the drawings, *a* designates the upper half or section and *b* the lower half or section of a hollow valve B, both of said sections being concavo-convex in shape and the upper section, *a*, being formed with the central neck *c*, to which the stem F is welded, thus making the metal continuous. The halves or sections of the valve are formed from sheet steel and are pressed or stamped to the shape shown and then brought together and their meeting edges welded, by electricity or otherwise, to form the valve as shown in Figs. 1 and 3.

In Fig. 4 is shown a modification in which the edge of the upper half or section, $a$, is provided with a lip $e$ which extends across the joint when the sections are brought together, the purpose of which being to prevent the metal running down during the welding operation and thereby causing an uneven thickness in the shell inaccessible to be dressed.

In Fig. 5 is shown a modified form of joining the sections or halves in which the joint is shown as a plain butt joint with a strap $f$ covering the same and held in position by patch bolts $g$ and calked.

In Fig. 6 is shown a modification in which the joint is formed by threading the sections circumferentially, as at $h$, and screwing thereon a threaded band $i$ and fastening the same in place by patch bolts $k$.

In Fig. 7 is shown a modification in which the upper section is reduced in diameter and exteriorly threaded circumferentially at its edge, as at $m$, and the lower section interiorly threaded, as at $n$, and the sections lapped and screwed together and held against movement by patch bolts $o$.

In Fig. 8 is shown a modification wherein a threaded halving lap-joint $p$ is employed to secure the sections together with a patch bolt $r$ to prevent movement, while in Fig. 9 a plain lap-joint is employed and patch bolts used to secure the sections together, but the sections are not threaded.

It will be understood that in all the modifications showing the connection of the sections other than by welding that all the joints are made water tight by calking.

The nature and shape of the valve seat castings for valves of the type described are such that it is extremely difficult to obtain perfectly solid metal in these products. Blow holes, pittings, and honeycombing are very common and sometimes impossible to detect before the valve seat is in position and subjected to extreme external heat with a water pressure inside under which conditions the small holes in the castings open and permit of the introduction of moisture into the air passing over the parts which is thereby carried into the furnace.

To obviate the objections noted above and produce a valve seat of uniform thickness throughout as well as one that is perfectly air and water tight under all the conditions to which it may be subjected I flange the seats to shape from rolled steel plates. The shape given the body of the seat may be varied with equally good results and I have illustrated several forms thereof. Thus in Figs. 10 and 11 is shown a seat the main portion of which is flanged from one piece and in which $d$ represents the seat, proper, $d^1$, an inner annular partition or ring forming, with the nose of the seat, the water chamber $d^2$, and $d^3$ a perforated outer ring which permits air cooling and also serves to hold the top and bottom of the seat properly spaced apart. In this instance the body or main portion of the seat consists of a single sheet or piece bent, by flanging, to shape, and the rings $d^1$ $d^3$ are held in place by rivets $d^4$ connecting the top and bottom and pinching the same on the rings. A partition $d^5$ is arranged transverse the water chamber $d^2$ between the inlet opening $d^6$ and outlet opening $d^7$ in order to prevent short circuiting of the water from the inlet to the outlet openings. A pipe $d^8$ from any convenient source of supply is connected to the opening $d^6$ to supply the water and a pipe $d^9$ is connected to the opening $d^7$ for the discharge of the same. In Fig. 12 is shown a seat having a sharper nose $e^1$ than that shown in Figs. 10 and 11, but is otherwise similar in construction. The shape here shown is easier to flange and is preferred for the reason that it makes a desirable bearing surface for the valve. In Fig. 13 the seat is shown as formed from two flanged pieces $f^1$ welded together at $f^2$. In Fig. 14 is shown a seat formed by welding together a flanged piece $g^1$ and a flat piece $g^2$, the weld being made at each side, as at $g^3$. In Fig. 15 is shown a seat, $h^1$ formed from a single piece of material flanged so that its edges meet at one corner, at which point, $h^2$, the joint is welded. All of the shapes or forms shown are designed to be water cooled by the circulation of water therethrough in a manner similar to that shown in Fig. 10, and instead of using rivets as shown in Figs. 10, 11 and 12 to hold the top and bottom of the seats in pinching contact with the rings shown therein, said rings may be welded in place.

While I have shown and described a number of methods whereby the sections may be rigidly joined in water tight connection, I do not desire to be confined to any particular method of so joining, as it is obvious that other means may be employed for a like purpose without departing from the scope of my invention.

What I claim is:

1. A hot-blast valve, comprising an upper and lower section each pressed to a concavo-convex shape in sheet metal, and rigidly joined together to form a hollow valve.

2. A hot-blast valve, comprising two sections each pressed to a concavo-convex shape in sheet metal, and rigidly joined together to form a hollow valve and one of said sections having an integral neck.

3. A hot-blast valve, comprising an upper and lower section each pressed to a concavo-convex shape in sheet metal, and welded together to form a hollow valve, and one of said sections having an integral neck.

4. A hot blast valve seat, consisting of a circular hollow structure adapted to be water cooled, the parts of said structure being pressed or flanged to shape from sheet metal and rigidly joined together.

5. A hollow hot blast valve, comprising an upper and lower section rigidly secured together, one of said sections being pressed to a concavo-convex form to adapt it to fit a valve seat.

6. A hollow hot blast valve, comprising an upper and lower section rigidly secured together, one of said sections being adapted to fit a valve seat, and the other having an integral stem.

In testimony whereof, I affix my signature, in the presence of two witnesses.

PAUL L. KEISER.

Witnesses:
GEO. H. BAER,
GEO. ZOELLER.